(12) United States Patent
Berkovich et al.

(10) Patent No.: US 8,761,497 B2
(45) Date of Patent: Jun. 24, 2014

(54) REMOVAL OF SHADOWS FROM IMAGES IN A VIDEO SIGNAL

(75) Inventors: Erez Berkovich, Kfar Biyalik (IL); David Peles, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 182 days.

(21) Appl. No.: 13/141,751

(22) PCT Filed: Dec. 10, 2009

(86) PCT No.: PCT/IB2009/055655
§ 371 (c)(1),
(2), (4) Date: Jul. 20, 2011

(87) PCT Pub. No.: WO2010/073172
PCT Pub. Date: Jul. 1, 2010

(65) Prior Publication Data
US 2011/0273620 A1    Nov. 10, 2011

(30) Foreign Application Priority Data

Dec. 24, 2008    (IL) .......................................... 196161

(51) Int. Cl.
*G06K 9/62*    (2006.01)

(52) U.S. Cl.
USPC ........................................................ 382/155

(58) Field of Classification Search
USPC ........................................................ 382/155
See application file for complete search history.

(56) References Cited

U.S. PATENT DOCUMENTS

| | | | |
|---|---|---|---|
| 6,349,113 B1 * | 2/2002 | Mech et al. | 375/240.08 |
| 7,254,268 B2 | 8/2007 | Zhao | |
| 7,480,414 B2 | 1/2009 | Brown | |
| 7,574,043 B2 | 8/2009 | Porikli | |

FOREIGN PATENT DOCUMENTS

GB    2341507    3/2003

OTHER PUBLICATIONS (Jacques Jr, Julio, "Background Subtraction and Shadow Detection in Grayscale Video Sequences", 2005, IEE, Proceedings of the XVIII Brazilian Symposium on Computer Graphics and Image Processing (SIBGRAPI'05)).*
(Javed, Omar, "Tracking and Object Classification for Automated Surveillance", 2002, Spriner-Vwerlag berlin Heidelberge, p. 343-357).*
(Elena Salvador, "Shadow Identification and Classification Using Invariant Color Models", 2001, IEEE).*
(Avery Zhang, "An Investigation into Shadow Removal from Traffic Images", Nov. 15, 2006, TRB 2007 Annual Meeting CD-ROM).*

(Continued)

*Primary Examiner* — Samir Ahmed
*Assistant Examiner* — Totam Le
(74) *Attorney, Agent, or Firm* — Mark M. Friedman (57) ABSTRACT

Substantially removing shadows in video images obtained from a camera viewing a scene, at variable pointing angles and magnification, by digital processing of a sequence of frames in the video signal, the processing including—(a) creating and maintaining a model image of the scene, by accumulating image data from a plurality of video frames; (b) in the model image, detecting and defining model shadow zones; (c) calculating correction factors for the model shadow zones; (d) for each frame of the video signal—defining, in the image carried by the signal, shadow zones that correspond to respective model shadow zones; and (e) correcting video signal values in shadow zones accordingly.

32 Claims, 4 Drawing Sheets

(56) References Cited

OTHER PUBLICATIONS

Avery, Zhang, Wang and Niham, "An Investigation Into Shadow Removal From Traffic Images" TRB 2007 Annual Meeting CD-ROM, Nov. 15, 2006, pp. 1-15.

Very, Zhang and Wang, "A Video-Based Vehicle Detection and Classification System for Real-Time Traffic Date Collection Using Uncalibrated Video Cameras", TRB 2007 Annual Meeting CD-ROM, 2007, p. 1-16.

* cited by examiner

Figure 1

| Transform | Example | Transformation Matrix | Remark |
|---|---|---|---|
| Translation | | $\begin{bmatrix} 1 & 0 & 0 \\ 0 & 1 & 0 \\ t_x & t_y & 1 \end{bmatrix}$ | $t_x$ specifies the displacement along the $x$ axis<br><br>$t_y$ specifies the displacement along the $y$ axis |
| Scale | | $\begin{bmatrix} s_x & 0 & 0 \\ 0 & s_y & 0 \\ 0 & 0 & 1 \end{bmatrix}$ | $s_x$ specifies the scale factor along the $x$ axis<br><br>$s_y$ specifies the scale factor along the $y$ axis |
| Shear | | $\begin{bmatrix} 1 & sh_y & 0 \\ sh_x & 1 & 0 \\ 0 & 0 & 1 \end{bmatrix}$ | $sh_x$ specifies the shear factor along the $x$ axis<br><br>$sh_y$ specifies the shear factor along the $y$ axis |
| Rotation | | $\begin{bmatrix} \cos(q) & \sin(q) & 0 \\ -\sin(q) & \cos(q) & 0 \\ 0 & 0 & 1 \end{bmatrix}$ | $q$ specifies the angle of rotation |
| Linear Conformal | | $\begin{bmatrix} s\cos(q) & s\sin(q) & 0 \\ -s\sin(q) & s\cos(q) & 0 \\ t_x & t_y & 1 \end{bmatrix}$ | Image is distorted by some combination of translation, rotation, and scaling ($s$ specifies the scale factor) |
| Affine | | $\begin{bmatrix} t & v & 0 \\ u & w & 0 \\ t_x & t_y & 1 \end{bmatrix}$ | Similar to Linear Conformal transform but the input image can also exhibit shearing |
| Projective | | $\begin{bmatrix} t & v & m \\ u & w & n \\ t_x & t_y & 1 \end{bmatrix}$ | Does not preserve sizes or angles but do preserve incidence and cross-ratio |

REMOVAL OF SHADOWS FROM IMAGES IN A VIDEO SIGNAL

FIELD AND BACKGROUND OF THE INVENTION

The present invention relates to image processing of video signals from natural scenes and concerns, in particular, removal of shadows in images carried by such video signals.

There are many situations in which video images are taken through a video camera of a natural scene in which there is a fixed and defined region of interest (ROI). For example, in the case of televised sporting events, the playing field is the region of interest, in which most of the interesting action takes place (though in the context of the present invention the ROI is not necessarily limited to the playing field, but may include, for example surrounding areas and structures). Another example is a surveillance system monitoring a scene with a defined region of interest. For clarity and compactness, the present disclosure describes the invention as applied to a sporting event but this is not to detract from its more general applicability. In view of this, the terms "region of interest" and "field" will be used interchangeably. It is noted that a region of interest is not necessarily a single contiguous area, but may generally consist also of a plurality of disjoint areas or may even include the entire scene viewed by the camera, and should thus be understood in the context of the present invention.

When a sporting event occurs outdoors in daytime, there are shadows cast naturally on the field surface by fixed objects in, and around, the field, as well as by moving objects—primarily the players. Because of the relatively limited dynamic range of perceivable brightness values in a video image, such shadows appear more pronounced than, say, to a viewer present at the scene and are thus annoying. Moreover, in areas of the field that are in the shadow of a large object (such as a large sign board or a gallery structure), important details, such as a rolling ball or the identity of players, become less visible. It would therefore be desirable to remove shadows, or at least reduce their effect, within the ROI in video images of such scenes.

British patent GB2341507 discloses a system for removing shadows from a television signal in real time. In this system each video frame is processed so as to extract mask areas that correspond to shadow, the masks having certain geometric constraints, and then pixel values that correspond to mask areas are modified to increase brightness. Also other shadow removal systems and methods have been disclosed, using a similar approach.

All disclosed systems and methods have, in common, several drawbacks, which include:
(a) Extracting a mask from each frame is inefficient in terms of processing power, thus either requiring high processing power, which is expensive, or limiting the processing to relatively unsophisticated methods.
(b) Due to inherent noise in a typical video signal, extracting a mask from each frame may result in randomly defined edges, which may cause visible artifacts in the resulting video image.
(c) Moving figures (such as players) may interfere with the mask generation process, thus leading to artifacts in the resulting video image.
(d) There is no reference to any known lighting direction in defining the mask areas, thus increasing the likelihood of false shadow identification; it is, furthermore, difficult to apply such reference when extracting masks on a frame-by-frame basis, especially if the camera's pointing direction is variable.

There is thus a clear need for a method and system for removing shadows from video images in real time, wherein the processing is efficient and the resulting effect is substantially accurate and devoid of artifacts—even in the presence of moving figures and with variable camera pointing direction.

SUMMARY OF THE INVENTION

The present invention aims at substantially removing shadows in video images obtained from a camera viewing the scene, at variable pointing angles and magnification, and contemplates digital processing of a sequence of frames in the video signal, the processing employing a number of novel principles: First and foremost among them is the storing of a background model of the scene, or of a part of the scene. Such a background model is an internally stored digital image, created and maintained by accumulating image data from a plurality of video frames, color and brightness values being averaged, thus reducing noise and artifacts. In the following description it will be referred to, interchange-ably, as model image (MI for short) and background model image. The model image is invariable to changes in the field-of-view of the camera; that is—the camera may pan (i.e. rotate in azimuth), tilt (i.e. rotate in elevation) and zoom (i.e. change focal length of the lens) and yet, by performing an appropriate geometric transformation on the images, image data from the resulting video frames may be added to the model. In other words, every pixel in the MI is continuously updated whenever a new value from a corresponding pixel, or group of adjacent pixels (if so mapped by the transformation), in an incoming frame is obtained.

In an optional configuration of the invention, also the entire camera may move (e.g. when mounted on a dolly) and yet, by applying enhanced transformation methods, its image data can still be accumulated in the MI. In another optional configuration, video signals from a plurality of cameras viewing the same scene may be processed for shadow removal and, again, by applying enhanced transformation methods, may be input to a common MI.

Fixed shadow zones are detected and characterized in the MI. The resulting characterization of each shadow includes the definition of its boundaries and determination of the required correction in pixel values, such as brightness, contrast and hue, or red, green and blue. These correction values, or parameters, are continually used to correct the corresponding image values in current video frames, as obtained from the camera, thus in effect removing, or greatly reducing, the corresponding shadows. In an alternative configuration, pixel values in the MI are corrected to remove shadows in the detected shadow zones and these corrected values are blended in with, or totally replace, corresponding pixel values in current video frames. All values obtained from the MI and thus applied to current video frames undergo the inverse of the aforementioned spatial transformation.

The MI usually reflects image data from a finite number of just past video frames, the number being large enough to allow useful averaging of pixel values, yet small enough to allow the model to follow slow changes in the field, such as varying light conditions due to passing clouds and varying light direction with the time of day. As the model changes, so do the calculated shadow parameters and correction values.

Shadows are detected in the MI, applying one or more of the following principles:

(a) Shadows are assumed to be cast by objects at the perimeter of, or outside, the field and thus to extend from its boundary inward.
(b) The direction of the assumed single light source—e.g. the sun—is known and thus the directions of lateral shadow boundaries may be calculated.
(c) Color and texture of the field is assumed to have slow spatial variation and therefore—continuous across shadow boundaries, which involve relatively sharp variation in brightness.

Correction values for shadow areas are calculated, based on the last-mentioned assumption (c), by comparing locally-averaged pixel values in shadow zones with those just outside them. High-contrast features in the field, such as line markings and zone coloring, are detected in a separate process and are treated appropriately in the shadow detection and—correction processes.

Moving objects—notably players—are treated separately at each stage of the process. They are primarily detected in the incoming video signal, by comparing successive frames with each other or with the MI. The Field Background Model excludes all moving objects (i.e. it represents the static field scene only) and in its compilation all pixels in incoming frames that correspond to moving objects are ignored. Hence also in the detection of shadows and in the calculation of the correction parameters moving objects are ignored. During actual shadow correction (or removal) in current video frames, moving objects generally undergo the same correction as the surrounding field area.

When moving objects are near the boundary of a static shadow zone, they may have different illumination than the field surface; such a condition is optionally detected and treated differently in the shadow removal process.

When moving objects are in lighted areas they cast their own shadows (including their own shaded sides). Such shadows are optionally detected and removed during the processing of current frames. In such shadow detection process, the aforementioned principles (b) and (c) are applied, while the shadow correction process may use parameters calculated for nearby static shadow zones.

According to the teachings of the present invention there is provided a method for detecting and removing shadows in images that are carried by a digital video signal, obtained, directly or indirectly, from a video camera aimed at a scene, the method comprising:
(i) Combining corresponding values from a plurality of frames in the video signal and creating therefrom a model image of the scene or of a portion thereof;
(ii) in the model image, detecting and defining model shadow zones;
(iii) calculating correction factors for some or all of said model shadow zones;
(iv) for each frame of the video signal—defining, in the image carried by the signal, shadow zones that correspond to respective ones of said model shadow zones;
(v) correcting video signal values in shadow zones defined in step iv.

According to some features of the invention, step ii includes segmentation of pixel values, the segmentation being possibly in terms of a set of parameters, selected from among (a) brightness, (b) brightness and hue (c) (c) brightness, hue, and saturation, (d) R, G and B values and (e) R, G, B values and texture. In some versions of the method segmentation includes supervised learning and in some versions—unsupervised learning.

According to another feature of the invention, step i is repeated periodically; upon each repetition a selected one from the latest frames in the video signal becomes, in effect, part of said plurality of frames.

According to other features of the invention, the field of view of the video camera may change by tilting, panning, zooming and/or dallying the camera, step i includes geometric transformation of the image carried by any frame, such as to adjust for any effects due to the change in the field of view and step iv includes geometric transformation of any model shadow zone, such as to adjust for any effects due to that change in the field of view. If the image in any frame includes only part of the scene or of the portion thereof that corresponds to the model image, said combining in step i is with respect to values corresponding to only the included part of the scene, or of that portion.

In some versions of the method there may be at least one additional digital video signal, similarly obtained from a corresponding additional video camera aimed at the scene, and the values in step i additionally include values from frames in the additional video signals.

According to yet other features of the invention, the method includes detecting and defining, in the model image, boundaries of a region of interest and shadow zones defined in step ii include only zones that border on a boundary of the region of interest; further, if the direction of the illumination of the scene is known, the shadow zones include only zones whose outline shape is consistent with the direction of illumination.

Another feature of the invention is to automatically divide the model image into sectors, each having essentially uniform color and texture, any adjacent sectors having mutually different colors and/or textures, and to carry out steps ii and/or iii mutually independently among the sectors.

According to yet another feature of the invention, the correction factors are calculated in step iii so as to modify any image values within the respective shadow zone to essentially equal those in nearby areas outside any model shadow zone—the correction factors possibly including mutually independent R, G and B values.

An optional version of the invention further comprises correcting values within model shadow zones in the model image, possibly creating therefrom a corrected model image, and calls for the correcting in step v to include applying the corrected values from corresponding model shadow zones.

The method of the invention may further comprise detecting any moving objects in the image carried by the video signal and, for each detected moving object or portion thereof that is within any shadow zone, modifying corresponding correction factors and applying the modified correction factors to pixels that correspond to the object. Optionally, for each detected moving object, or portion thereof, that is outside all the shadow zones, the method also comprises detecting and removing the shadow cast by the object.

According to another aspect of the present invention there is provided a system, including computing means programmed to carry out the steps of the method described herein.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a system for the removal of shadows from images in a video signal according to the present invention may be better understood with reference to the drawings and the accompanying description.

Figure 1:
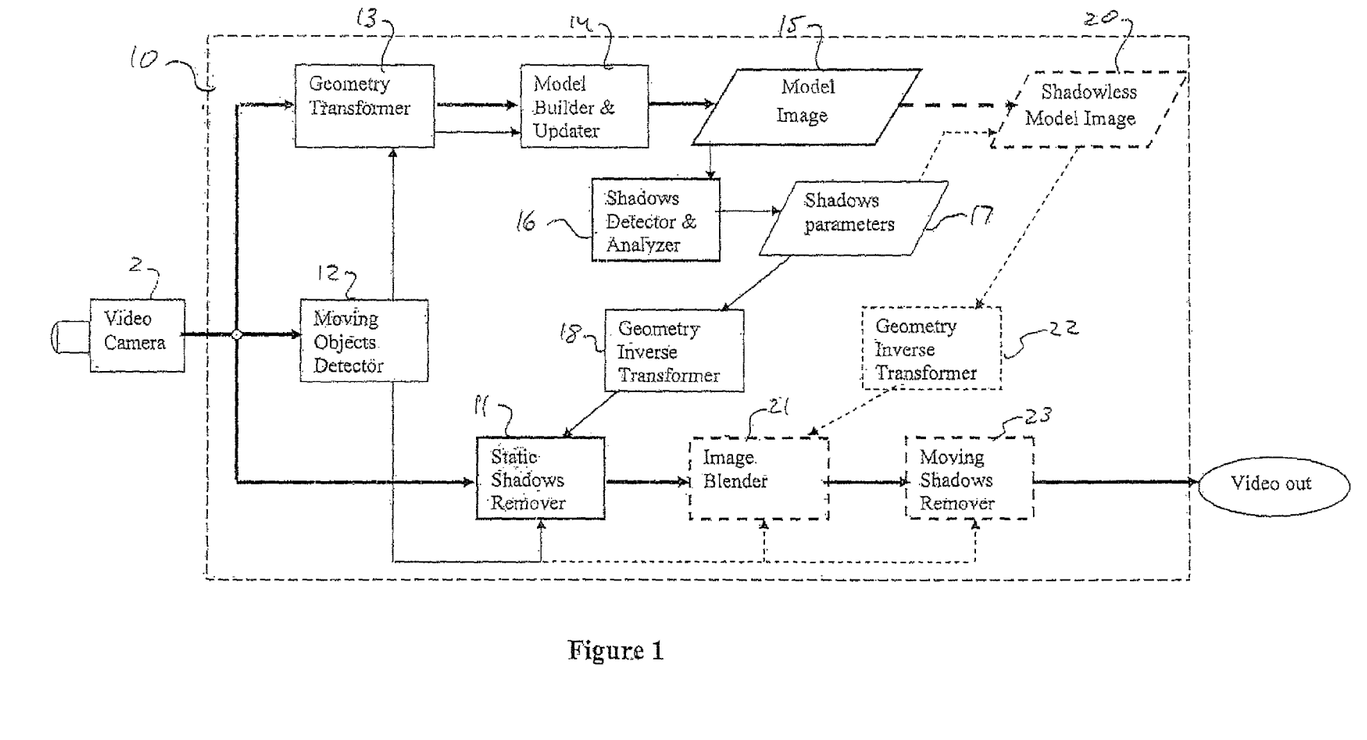
FIG. 1 is a block diagram of a digital processing system for shadow removal in a video signal, embodying the method of the invention.

Referring now to the drawings, FIG. 1 depicts a preferred embodiment of the invention, namely a digital Shadows Removal System (SRS) 10 for removing shadows from images carried in a video signal that is obtained from a video camera 2. The video camera is assumed to have the capabilities of being panned (i.e. rotated in azimuth), tilted and zoomed (i.e. changing its focal length). If the output of the camera is an analog video signal, it is converted to a standard digital video signal, using means known in the art, such as Video Sampler 4. The digital video signal thus obtained, directly or indirectly, from the video camera is continuously fed to a Static Shadows Remover (SSR) 11, where shadows within a defined region of interest (ROI), e.g. a playing field, are removed, or corrected for, as will be explained further below. According to a first configuration of the system, the output of SSR 11 is the final video output of the system 10. In other configurations the signal undergoes further processing in optional blocks 21 and/or 23, to be described further below.

Figure 2:
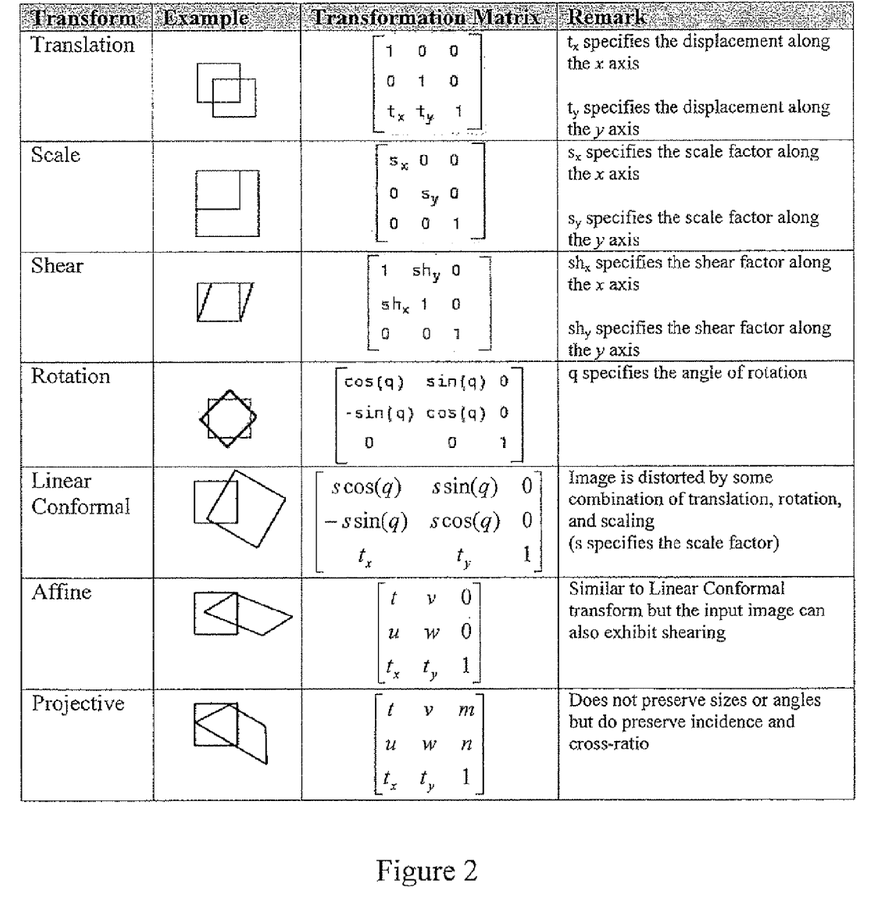
FIG. 2 is a table of spatial (i.e. geometric) transformation functions used in transforming images between their two spatial representation forms in the system of FIG. 1.

The digital signal from the video camera is fed also, frame by frame, through a Geometry Transformer (GT) 13 to Model Builder and Updater (MBU) 14. Generally only some of the video frames are thus fed to MBU 14, for example—sequentially each Nth frame. For each such frame, the incoming raster image representation undergoes in GT 13 a geometric transformation into a standard raster image representation that corresponds to a predetermined camera direction and focal length. FIG. 2 lists typical transformation functions that may be implemented in GT 13. By applying these functions—singly or in combinations (whereby, for example, several of the matrices are combined into a single matrix)—any current deviation of the camera 2 from such predetermined direction (in azimuth and elevation) and focal length is compensated for and the image representation that reaches MBU 14 is invariant to the camera's settings.

The current camera parameters, i.e. direction- and focal-length values, may be obtained from suitable sensors or controllers in the camera. Alternatively they may be obtained by analyzing the incoming video images, detecting therein certain reference points, such as features in field boundaries or corners in field markings, and therefrom calculating the camera parameters or directly the geometric transformation parameters. Such techniques are known in the art and therefore not illustrated or further explained herein.

In certain configurations of SRS 10 the geometric transformation performed in GT 13 includes also so-called localized transformation functions known in the art, such as Optical Flow, which cannot be represented by matrices. Their use enables correction of relative position of certain image details associated with objects in the field that are relatively near; such relative positions change when the camera's position changes—for example when the camera is mounted on a dolly that is moved about (which movement is commonly termed dollying). In these configurations the MI may thus be fed image data and be maintained even while the camera moves (in addition to its swiveling and/or zooming as discussed above).

An additional correction that may be performed in GT 13 is for any geometric distortion due to the camera's lens. Such a distortion, which is fixed and measurable and usually minor, can generally be expressed as a function of radial distance from the center of the frame. The transformation carried out in the GT is modified accordingly.

It is the function of MBU 14 to build up and maintain, as a background, a Model Image (MI) 15, which is a stored image, in the standard raster representation, that includes the entire ROI (or field). Preferably this image is maintained at a resolution that equals or exceeds the highest resolution available from the camera, namely that obtained at the longest focal length for the nearest portions of the field. There is preferably a correspondence between pixels in the image representation obtained from GT 13 and those in MI 15. MBU 14 applies pixel values obtained from GT 13 to update corresponding pixels in MI 15. Such updating may be, for each pixel, by way of replacement or, preferably, by way of calculating a weighted average with current values (blending) or a running average over a given number of frames or by any other method known in the art. Some typical methods are discussed, for example, in the following articles:

(a) Ahmed Elgammal, David Harwood, Larry Davis: "Non-parametric Model for Background Subtraction" in *6th European Conference on Computer Vision*. Dublin, Ireland, June/July 2000;

(b) C. Stauffer and W. Crimson, "Adaptive background mixture models for real-time tracking" in *IEEE Proc. CVPR*, 1999;

(c) C. Wren, A. Azarbayejani, T. Darrell, and A. Pentland, Pfinder, "Real-time tracking of the human body" in *IEEE Trans. PAMI*, 1997;

(d) Q. Zhou and J. Aggarwal, "Tracking and classifying moving objects from video" in *IEEE Proc. PETS Workshop*, 2001.

As noted above, incoming video frames may generally not contain image data for all points in the field, e.g. at high zoom levels (long focal length); likewise, their resolution may be low (at low zoom levels), compared with that of the MI; accordingly, only those pixels in the MI that correspond to actual values in the current transformed frame are updated. As the camera's settings change during an event, generally all pixels in the MI are eventually updated The overall effects of such updating are the building-up of the MI as an image of the entire field that (a) is fairly up-to-date, (b) is of high resolution and (c) has relatively low image noise (owing to the averaging effect). Clearly, during the initial stage of a televised event, it may take a while for the MI to accumulate data for all the pixels; such a stage may, for example, be carried out during a preliminary run prior to active broadcasting.

Optionally, the image quality in the MI is enhanced, using image enhancement methods known in the art.

It is the background model image, rather than current video frames, that is used to detect and analyze shadows and to calculate correction parameters therefrom. This is due to the advantageous characteristics of this image, such as enumerated above and has the further significant advantage that such processes need not be limited in time to the duration of a video frame (as would be the case if these processes operated on the running video signal). On the other hand the use of such a slow changing image for this purpose is enabled by the relative constancy of the shadows in the scene—at least those that relate to static objects; the effects of moving objects are discussed further below.

The processes of shadow detection, analysis and characterization are carried out in the preferred embodiment by a Shadows Detector and Analyzer block (SDA) 16, which operates on image data in the MI 15. Any techniques for detecting and defining shadow regions known in the art may be utilized. However in the preferred embodiments they typically include any, but not necessarily all, of the following operations:

(a) delimiting the region of interest (ROI), e.g. the playing field, preferably automatically—based on some distinct common image characteristics, such as range of hues or texture, and on a detectable and geometrically characterizable boundary; alternatively—delimiting manually;

(b) detecting within the ROI permanent geometric features, such as marked lines, painted areas or grass zones, accordingly dividing the ROI into sectors and characterizing each sector as to color (e.g. brightness, hue and saturation, or RGB component values), or range of colors, and as to texture;

(c) segmenting all pixels (or averaged groups of adjacent pixels) within the ROI, e.g. by brightness value, into two categories—corresponding to light and shadow respectively (wherein the segmentation criteria are preferably different for the various sectors and may vary even within any one sector, reflecting varying color within the sector);

(d) delimiting, by a suitable closed line, each contiguous area that includes only pixels categorized as shadow;

(e) checking that each such area answers two criteria, namely (1) it borders (or extends beyond) the boundary of the ROI and (2) at least two lateral sides have directions that are consistent with the direction of illumination of the field (e.g. direction of the sun); optionally correcting any small deviations from such criteria;

(f) registering each of the aforementioned areas as a shadow zone (hereunder referred to also as a model shadow zone);

(g) for each shadow zone comparing pixel values therein, averaged over its entirety or over segments thereof, of arbitrary size, with similarly averaged pixel values in some nearest areas of the field image that are not in a shadow; the segments are preferably so delimited that each lies within a single one of the sectors defined in operation 'b'; the segment boundaries are preferably defined so that pixel values within any segment are within some defined small range, i.e. approximately uniform;

(h) for each shadow zone, calculating from the results of operation g a set of correction factors, such that when applied to the pixel values would render them essentially equal to what they would have been in full light, i.e. in the absence of shadow.

The first two of the above operations are preliminary in nature and generally need be done only once for a given situation; all the others are carried out repeatedly, as the MI data are updated. It is noted that the repetition rate is generally much lower than the video frame rate, but preferably high enough to follow changing light conditions (such as passing clouds). Operations c-f are aimed at detecting shadows and delimiting their areas. Operations g-h constitute analysis of the shadow zones. The results of Operations 'f' and 'h' are stored in a Shadows Parameters Register (SPR) 17 and are repeatedly updated.

Figure 3:
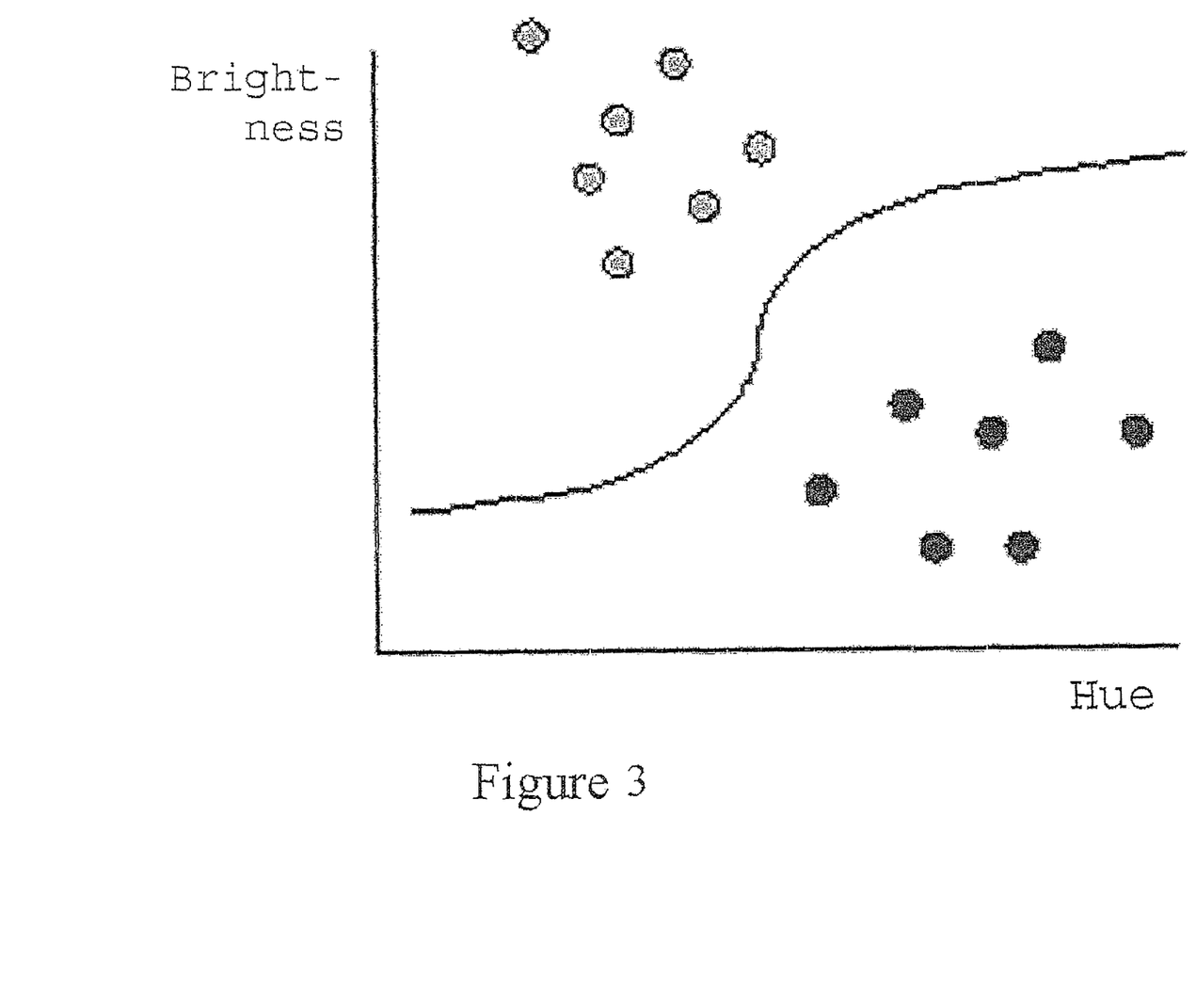
FIG. 3 is a diagram illustrating classification of pixel values into light- and shadow regions according to an embodiment of the invention.

Pixel segmentation into illuminated-vs. shadow values (operation c above) may be carried out, for example, in the following manner: There is selected a set of relevant pixel parameters, such as, for example, (1) R, G, and B values or (2) brightness values or (3) brightness and hue values or (4) brightness, hue and saturation values; for a group of adjacent pixels another parameter may be some measure of texture, so that a selected set of parameters may be, for example, R, G, B and texture values. Each parameter is assigned a threshold value; the threshold values may be preset or they may be settable by an operator (preferably aided by an interactive display of the MI—see next paragraph). The relevant values of each pixel (or group of adjacent pixel) are compared with the respective threshold values; if there is a single parameter, the outcome of the comparison determines the pixel's class (illuminated vs. shadow); if there are several parameters, the pixel's class is determined according to whether one, a majority, all or another given number of the values exceed the threshold In an alternative approach, known as "supervised learning", there is collected (possibly from one type of field sections at a time) a sample group of pixel values (along a given set of parameters, such as listed hereabove) from illuminated areas and another, similar, sample group from shadow areas. Such collection is generally guided by a human operator (again, preferably aided by an interactive display) and is therefore termed "manual labeling". Some classification algorithm, such as Maximum Likelihood or Support Vector Machine (all known in the art), is then applied by SDA 16 to the samples so as to optimally divide the space of all possible values into two sub spaces that correspond to pixels from lighted areas and shadows, respectively. Depending on the number of pixel parameters considered, and therefore on the number of dimensions of the values space, there is thus defined a dividing point (in the case of one dimension, e.g. brightness alone), a dividing line (in the case of two dimensions, e.g. brightness and hue), which is generally a curve, or a dividing surface (in the case of three dimensions, e.g. R, G, B values). FIG. 3 depicts schematically an example of a two-dimensional case, with Brightness and Hue as the characteristics. Here a group of samples from lighted areas 32 and a group from shadow areas 34 are mapped; the curve 36 is the calculated boundary between the "light" and "shadow" subspaces of the Brightness-Hue space. Practically such a map, with the dividing line, can be embodied, for example, by a lookup table. All pixels in the MI will then be classified according to the subspace into which their values will be mapped and the model shadow zones will be defined accordingly.

In another alternative approach, known as "unsupervised learning", there is collected (again, possibly from one type of field sections at a time) a large sample group of pixel values (again, the values of each pixel being along a given set of characteristics, such as listed hereabove), taken from image areas of the field. This collection is done without any prior labeling and can therefore be performed by the system alone (preferably based on analysis of the field, such as done in operation a and b hereabove). SDA 16 then applies to the sample group a clustering algorithm, such as the k-means clustering algorithm, which divides them into two groups that map into respective separate and distinct regions in the space of the relevant pixel characteristics. Subsequently SDA 16 proceeds to divide the entire pixel characteristics space into two subspaces—generally in a manner similar to that in the supervised learning case, as described above—and to then define the shadow zones accordingly.

Optionally, the MI is displayed as an image on a screen (not shown) that is visible to a human operator. Within this option, also the defined shadow zones are preferably displayed—e.g. as an overlay tint or in terms of their boundaries—enabling the operator to check the veracity of the detected zones. Also preferably he is provided with means to point to any such zone, so as to negate it (in case of erroneous shadow detection), or to correct its boundaries. Also preferably he may be able to point to an undetected shadow area in the image, thus inducing the SDA 16 to attempt to detect the shadow therein, possibly using segmentation parameters different from those used before. Alternatively he may be able to draw the boundaries of the shadow and to manually designate it as another shadow zone. It is noted that the availability of operator intervention in shadow zone definition in any manner, such as described hereabove, is facilitated by the stability of the model image, thus pointing to another advantage of the latter.

An additional useful practice may be to obtain images of the field when the shadows are minimal (e.g. at noon time), and to use them to build an initial version of the MI. Later, at broadcast time, the current model image is compared with the initial version and all pixels whose brightness is now essentially lower are considered to belong to shadow zones.

Referring to operations g and h above, to the extent that the various segments within any one sector call for different correction factors and these differences indicate some gradient in the lighting or in the shadow effect, a suitable gradient function may be calculated and applied to the correction factors of all pixels therein; the gradient function may optionally be calculated in common for a plurality of sectors, possibly even over a plurality of shadow zones. An alternative method, applicable to operation g, is to detect any gradient that may be present in the lighting effect and to calculate its direction; the comparison between pixels within a shadow zone and pixels outside the shadow zones is then carried out along lines that are normal to the direction of the gradient. An additional refinement concerns edges of any shadow zone where the transition between shadow- and light values in the image may be gradual (representing fuzziness, due for example to the diameter of the sun); here a gradient function may be calculated for all such edges and the correction factors therealong are preferably modified accordingly.

The shadows parameters, i.e. the coordinates of shadow zone boundaries and of corrections factors therein, as stored in SPR 17, undergo in a Geometry Inverse Transformer (GIT) 18 a geometric transformation so as to correspond to the pixel structure of current video frames. This transformation is, in effect, the inverse of the transformation currently carried out in GT 13 and uses, for example, functions that are the inverse of those listed in FIG. 2.

The transformed shadows parameters, as obtained from GIT 18, are applied to SSR 11. Here each video frame undergoes correction, wherein shadow zones are defined by the transformed boundaries of the corresponding model shadow zones and every pixel that falls within each thus defined shadow zone is corrected according to the corresponding correction factor. Every such pixel thus assumes a value that is presumed to be similar to that which would have occurred absent the shadow in the field. Thus, in effect, the relevant shadow in the image is removed or made invisible or its intensity is considerably reduced.

Optionally, image improvements are applied in shadow areas in order to improve the resulting corrected image quality. These may include reducing or removing noise, which is inherent to brightened areas, using methods known in the art, and deblocking algorithms, such as known in the art, to remove compression artifacts.

All that has been described so far applies strictly only to static images, i.e. such that contain no moving objects. For the more general case of moving objects in the field (such as players) and their counterparts in the images, the procedures described above are modified as follows:

The signal from Video Camera 2 is applied also to Moving Objects Detector (MOD) 12. Here moving features in the image (which are image elements associated with moving objects in the field, such as players) are detected by comparing each current frame with a previous frame, as is well known in the art. In an alternative configuration (not shown), current frames are compared with the background model (after it undergoes geometric inverse transformation).

Information about the location and size of all detected moving features is fed from MOD 12 through GT 13 (or a similar geometry transformer) to MBU 14. The latter, in response, masks out from the data it applies to MI 15 all pixels whose positions correspond to those of the moving features. Thus any updating of the background model excludes moving image features. This has the advantage that shadow zones in the model image, which generally relate to the surface of the field and are essentially static in nature, will not be distorted by the transient effects of moving features—all the more so as moving objects in the scene (such as players) usually protrude considerably above the field surface and present non-horizontal surfaces and thus exhibit complex shadow effects.

Moving features are of course not removed from the main video signal that is applied to SRR 11 and they generally undergo the same shadow correction as the static portions of the image. Their positions and sizes are nevertheless transmitted from MOD 12 also to SSR 11. If such positions fall near an edge of a shadow zone and if the direction of the camera's view is considerably different from the direction of the sun, the shadow removal process is optionally modified in any of several possible manners: According to one preferable manner, the moving feature itself is segmented into illuminated and shaded zones. According to another manner, the position of the shadow boundary on the moving feature (which is considered to be associated with an essentially vertical object, as in the case of a player) is calculated from the position of its lower end (e.g. player's foot) relative to the underlying static shadow boundary, using information about the direction of the sun and the viewing direction of the camera. In either manner, the pixels in the shaded zone of the moving feature are corrected essentially as those in static areas. Possibly the shadow parameters of the underlying static area, as obtained from SPR 17 (through GIT 18), are used for this correction; another possibility is to calculate and store special shadow parameters for moving features and use them in the correction process.

In another configuration of SRS 10 there is optionally a Moving Shadows Remover (MSR) 23 in the path of the output video signal. MSR 23 receives from MOD 12 data about moving features and, within corresponding areas of the current image, detects shadows possibly cast by the corresponding moving objects in the field. Such detection uses a process similar to that described above for static shadow detection and preferably uses available information on illumination direction (such as used also in operation 'e' above). Preferably the shadow detection process is restricted to non-staticshadow areas (as derivable, for example, from data obtainable from GIT 18). The shadow strength is evaluated by comparison with nearby image areas; alternatively, its value is obtained from shadows parameters data (output by GIT 18) for the nearest static shadow zone. A suitable correction factor is then calculated and applied to the pixels in the detected moving shadow area—to effectively remove it.

Figure 4:
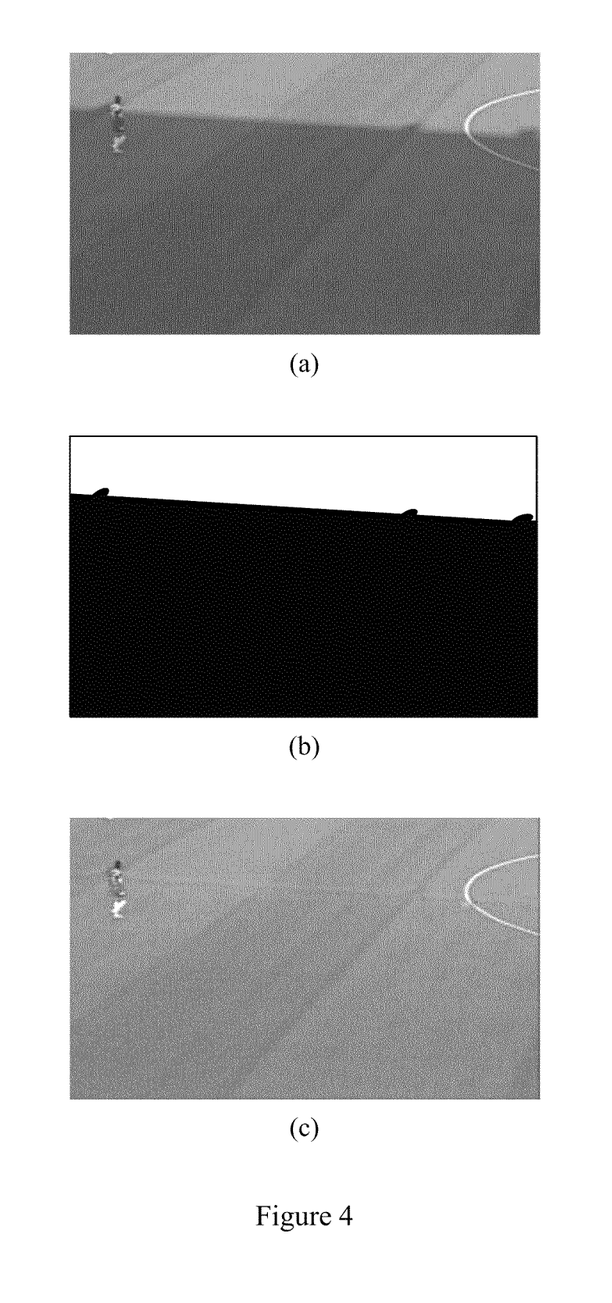
FIG. 4 is a reproduction of sample images, illustrating shadow removal by the method of the invention.

In FIG. 4 are reproduced three images that illustrate, by way of example, various stages in the shadows removal process described hereabove. They relate to a selected frame of the video signal, showing an examplary scene (playfield) with a moving object (player). Image 'a' is from the original video signal and shows the scene with a large shadow area, which cover also part of the player. Image 'b' is a binary image showing (in black) the defined shadow zone. Image 'c' is from the corrected video signal and shows the same scene as image 'a' but with the shadow removed.

In an alternative configuration of SRS 10 there is another process to remove static shadows, which may be alternative or supplementary to that carried out by SSR 11 as described above. In this configuration there is stored another background model of the ROI, termed Shadowless Model Image (SLMI) 20. It is identical to MI 15, except that all static shadows have been removed (or corrected for). This effect is obtained by applying shadows parameters, as stored for example in storage 17, to the image data from MI 15 and accordingly correcting the pixels in the shadow zones—for example in a manner similar to that described above for SSR 11.

Image data from SLMI 20 undergoes geometric transformation in Geometry Inverse Transformer (GIT) 22—similarly to the transformation in GIT 18—and is fed to an Image Blender (IB) 21 in the main path of the video signal. Here it is used, preferably within shadow zones (as delineated in data from GIT 18), to either replace or blend in with corresponding current image data (as possibly corrected in SRR 11). The advantage of this is that corrected shadow areas will, in this manner, appear less noisy than they would in the first configuration.

In a variation of this alternative configuration, an initial version of a shadowless MI is obtained by imaging the field when shadows are minimal (e.g. at noon time). The remaining shadows are then detected and removed, by using, for example, the methods described above. The advantage of this approach is that most of the SLBM image will be truly shadowless and will thus best serve its purposes as outlined hereabove.

In certain configurations, SRS 10 is adapted to receive signals from a plurality of video cameras and to similarly carry out shadow removal from each such signal. In some of these configurations there may be a background model, similar to MI 15, maintained for each such video signal. In others a single MI may be maintained in common for a plurality or all of the video signals. In these latter versions the geometry transformations applied to the signal on its way to- and from the MI, e.g. in GT 13 and GIT 18, are preferably enhanced to include localized transformation techniques, such as Optical Flow, known in the art. Localized transformation is required in order to compensate for parallax effects between the points of view of the various cameras. The advantage in using a common MI is the resultant averaging between the data from the various sources, thus further reducing noise and artifacts in the MI; this is particularly advantageous when using the option of blending into current video signals (e.g. in Image Blender 21) image data obtained from Shadowless Model Image 20.

It may be readily understood that any video signal input to SRS 10 may be obtained from video storage, rather than directly from a video camera. Similarly, any video signal output by SRS 10 may be fed to a storage device or system, rather than directly to a broadcast system.

The Shadows Removal System 10, or components thereof, may be embodied, in whole or in parts, as hardware components or as one or more suitably programmed calculating devices or as one or more programs, carried on suitable media and executable in a general-purpose computer. In another aspect, the present invention is also of a method to carry out its declared purpose, using operations essentially as described hereabove.

It will be appreciated that the above descriptions are intended only to serve as examples, and that many other embodiments are possible within the scope of the present invention as defined in the appended claims.

What is claimed is:

1. A method for detecting and removing shadows, the method comprising the steps of:
    (i) combining corresponding values from a plurality of frames that are carried by a digital video signal, obtained, directly or indirectly, from a video camera, any two frames of the video signal differing from each other owing to the field of view of the video camera changing by any camera action selected from tilting, panning, zooming or dollying or any combination thereof, said corresponding values being combined so as to create therefrom a background model image of the scene or of a portion thereof, said background model image covering a region greater than a field of view of at least one individual frame of the video signal;
    (ii) processing the background model image to detect and define within the background model image model shadow zones;
    (iii) calculating correction factors for some or all of said model shadow zones;
    (iv) for each of a plurality of frames of the video signal, determining a region of said background model image corresponding to the field of view of the frame, and thereby deriving, in the frame carried by the signal, frame shadow zones that correspond to said model shadow zones; and
    (v) correcting video signal values within said frame shadow zones.

2. The method of claim 1, wherein said processing includes segmentation of pixel values.

3. The method of claim 2, wherein said segmentation is in terms of a set of parameters, selected from among (a) brightness, (b) brightness and hue, (c) brightness, hue, and saturation, (d) R, G and B values, and (e) R, G, B values and texture.

4. The method of claim 2, wherein said segmentation includes supervised learning.

5. The method of claim 2, wherein said segmentation includes unsupervised learning.

6. The method of claim 1, wherein step i is repeated periodically; upon each repetition a selected one from the latest frames in the video signal becomes part of said plurality of frames.

7. The method of claim 1, wherein step iv includes geometric transformation of at least one model shadow zone, such as to adjust for any effects due to said change in the field of view.

8. The method of claim 1, wherein step i includes geometric transformation of the image carried by at least one frame, such as to adjust for any effects due to said change in the field of view.

9. The method of claim 1, wherein if the image in any frame includes only part of the scene or of said portion thereof that corresponds to the background model image, said combining in step i is with respect to values corresponding to only the included part of the scene or of said portion.

10. The method of claim 1, wherein there are one or more additional digital video signals, similarly obtained from corresponding additional video cameras aimed at the scene, and in step i said values additionally include values from frames in said additional video signals.

11. The method of claim 1, further comprising—
    (vi) in the background model image, detecting and defining boundaries of a region of interest;
    and wherein step ii is carried out within said boundaries.

12. The method of claim 11, wherein said model shadow zones defined in step ii include only zones that border on a boundary of the region of interest.

13. The method of claim 1, wherein the direction of the illumination of the scene is known and wherein said model shadow zones defined in step ii include only zones whose outline shape is consistent with the direction of illumination.

14. The method of claim 1, further comprising—
(vii) automatically dividing the background model image into sectors, each having essentially uniform color or texture, any adjacent sectors having mutually different colors or textures,
and wherein steps ii and iii are carried out mutually independently among said sectors.

15. The method of claim 1, wherein in step iii the correction factors are such as to modify any image values within the respective one of said model shadow zones to essentially equal those in nearby areas outside any model shadow zone.

16. The method of claim 15, wherein said correction factors include mutually independent R, G and B values.

17. The method of claim 15, further comprising—
(viii) calculating brightness gradients in the background model image,
and wherein said equality is along lines normal to the direction of the nearest calculated gradient.

18. The method of claim 1, wherein step i includes applying image enhancing techniques to the background model image.

19. The method of claim 1, wherein said correcting in step v is according to the corresponding correction factors calculated in step iv.

20. The method of claim 19, wherein step v includes image improvements in the shadow zones after correction.

21. The method of claim 1, further comprising—
(ix) correcting values within model shadow zones in the background model image,
and wherein said correcting in step v includes applying to one or more pixels of the video signal corresponding ones of said corrected values from the background model image.

22. The method of claim 21, wherein said applying includes substituting the value of a pixel by the corresponding corrected value or blending the value of a pixel with the corresponding corrected value.

23. The method of claim 21, further including creating a corrected background model image which includes the corrected values from step ix.

24. The method of claim 1, further comprising:
(x) Detecting any moving objects in the image carried by the video signal;
(xi) for each detected moving object, or portion thereof, that is within any of said shadow zones, modifying corresponding correction factors and applying the modified correction factors to pixels that correspond to said object.

25. The method of claim 24, wherein said detecting includes mutually comparing at least two video frames.

26. The method of claim 24, wherein said detecting includes comparing any video frame with the background model image.

27. The method of claim 24, further comprising—
(xii) for each detected moving object, or portion thereof, that is outside all the shadow zones, detecting the shadow cast by the object and removing or reducing it in the video signal.

28. The method of claim 1, wherein in step iii said calculating includes applying a gradient function.

29. The method of claim 20, wherein said improvements include noise reduction or deblocking or both noise reduction and deblocking.

30. A shadows removal system, adapted to receive, directly or indirectly, a digital video signal from a video camera moving so as to view regions within a scene and to implement a method for detecting and removing shadows in images that are carried by the video signal, the method comprising:
combining corresponding values from a plurality of frames that are carried by a digital video signal, obtained, directly or indirectly, from a video camera, any two frames of the video signal differing from each other owing to the field of view of the video camera changing by any camera action selected from tilting, panning, zooming or dollying or any combination thereof, said corresponding values being combined so as to create therefrom a background model image of the scene or of a portion thereof, said background model image covering a region greater than a field of view of at least one individual frame of the video signal;
processing the background model image to detect and define within the background model image model shadow zones;
calculating correction factors for some or all of said model shadow zones;
for each of a plurality of frames of the video signal, determining a region of said background model image corresponding to the field of view of the frame, and thereby deriving, in the frame carried by the signal, frame shadow zones that correspond to said model shadow zones; and
correcting video signal values within said frame shadow zones.

31. The system of claim 30, including a computing device having a program code embodied therein and adapted to execute said program code; execution of said program code implements said method.

32. A computer program product, comprising a non-transitory computer usable medium having a computer readable program code embodied therein, said computer readable program code adapted to be executed to implement a method for detecting and removing shadows in images that are carried by a digital video signal, obtained, directly or indirectly, from a video camera moving so as to view regions within a scene said method comprising:
combining corresponding values from a plurality of frames that are carried by a digital video signal, obtained, directly or indirectly, from a video camera, any two frames of the video signal differing from each other owing to the field of view of the video camera changing by any camera action selected from tilting, panning, zooming or dollying or any combination thereof, said corresponding values being combined so as to create therefrom a background model image of the scene or of a portion thereof, said background model image covering a region greater than a field of view of at least one individual frame of the video signal;
processing the background model image to detect and define within the background model image model shadow zones;
calculating correction factors for some or all of said model shadow zones;
for each of a plurality of frames of the video signal, determining a region of said background model image corresponding to the field of view of the frame, and thereby deriving, in the frame carried by the signal, frame shadow zones that correspond to said model shadow zones; and correcting video signal values within said frame shadow zones.

* * * * *